T. W. TOBIN.
Apparatus for Producing Optical-Illusions.

No. 146,293. Patented Jan. 6, 1874.

Witnesses.
Ernst Bilhuber
Chas. Wahlers

Inventor:
Thomas W. Tobin

UNITED STATES PATENT OFFICE.

THOMAS W. TOBIN, OF NEW YORK, N. Y.

IMPROVEMENT IN APPARATUS FOR PRODUCING OPTICAL ILLUSIONS.

Specification forming part of Letters Patent No. 146,293, dated January 6, 1874; application filed June 11, 1873.

*To all whom it may concern:*

Be it known that I, THOMAS W. TOBIN, of the city, county, and State of New York, have invented a new and Improved Optical Apparatus; and I do hereby declare the following to be a full, clear, and exact description thereof, which will enable those skilled in the art to make and use the same, reference being had to the accompanying drawing forming part of this specification, in which drawing—

Figure 1:
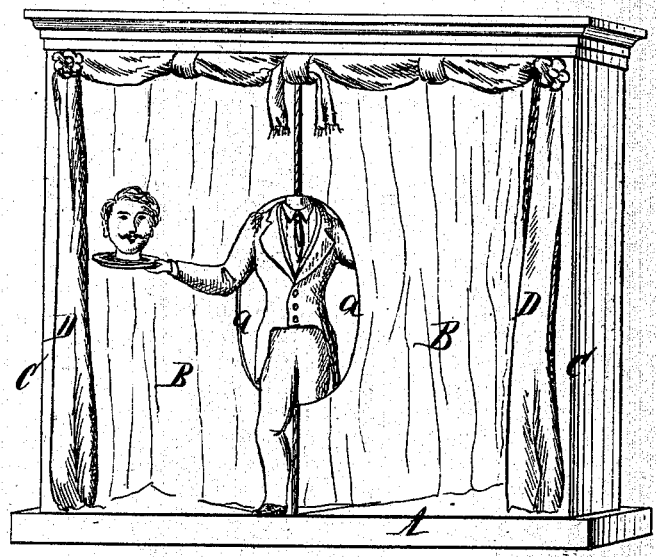
Figure 2:
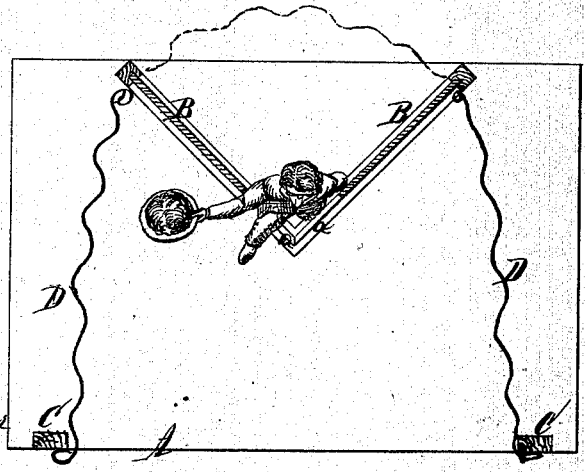

Figure 1 represents a front view of this invention. Fig. 2 is a horizontal section of the same.

Similar letters indicate corresponding parts.

This invention consists in the arrangement of a recess in the edge of each of two mirrors, which are set against each other at an angle of ninety degrees, more or less, in such a manner that a portion or portions of a living figure may be concealed or exposed to view, and by substituting and removing dummy limbs or parts for the real ones, and by exposing or concealing the real parts, various highly interesting effects may be produced. With the angular mirror are combined two curtains, which extend in curves from the inner edges of the mirror in such a manner that the figure to be exposed will appear well isolated from surroundings, and thereby the effect of my apparatus is materially improved.

In the drawing, the letter A designates a stage or platform, on which are set two mirrors, B B, at an angle of ninety degrees, more or less, toward each other, so that the corner formed at the joint of said mirrors will be situated a little back of the center of the platform, as shown in Fig. 2. Each of these mirrors is provided with a recess, *a*, of any convenient form or shape, and so situated that, when the two mirrors are placed edge to edge, as shown in Fig. 2, an opening, *a a*, is formed in the corner at the joint of the two mirrors, of sufficient size to allow a person standing behind the mirrors to expose such parts of his body as he may desire. The edges of the two mirrors which are to form the joint may be ground off, as shown in Fig. 2, or they may be concealed by a thick cord, or other material, extending down in front of them, as indicated in Fig. 1. From the sides of the platform A rise uprights C, which support the curtains D, and these curtains are so arranged that they extend in curves from the rear edges of the two mirrors.

By this arrangement the reflection or image of the curtains produced by the mirrors forms a continuation of the curtains, as indicated in dotted lines in Fig. 2, and, since the mirrors are invisible from the audience in front of the platform, a person standing in front of the mirrors on said platform will appear perfectly isolated.

The effect which may be produced by this apparatus will be readily understood from the following remarks: A person standing behind the mirror will be entirely concealed from the view of the audience, with the exception of those parts of his body which are visible through the aperture *a a*. Before the curtain is opened the person passes his right foot, his right arm, and his head through the aperture *a a*, the left foot and left arm being represented by dummies. The curtain is raised, and the whole person appears to be in full view. Then the operator cuts off the left foot, then the left arm; and, finally, the person, standing partly behind and partly in front of the mirror, draws his head back behind the mirrors, (the curtain being closed until he has performed this operation,) and all that remains visible is the trunk of his body, with one foot, one arm, and without a head; and if he takes a dummy head in his exposed hand the effect will be still more striking.

From this explanation, it will be readily understood that various illusions can be produced by means of my apparatus for the amusement of children and of grown persons.

What I claim as new, and desire to secure by Letters Patent, is—

1. The mirrors B B, each provided with an aperture, *a*, and united together at an angle, substantially as and for the purpose specified.

2. The curtains D, arranged as described, in combination with the platform A and the mirrors B B, having the apertures *a*, substantially as and for the purpose specified.

This specification signed by me this 28th day of April, 1873.

THOS. WM. TOBIN.

Witnesses:
W. HAUFF,
E. F. KASTENHUBER.